(12) United States Patent
Sato

(10) Patent No.: US 7,123,390 B2
(45) Date of Patent: Oct. 17, 2006

(54) IMAGE SCANNER

(75) Inventor: Yuji Sato, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 853 days.

(21) Appl. No.: 10/254,927

(22) Filed: Sep. 26, 2002

(65) Prior Publication Data
US 2003/0063332 A1   Apr. 3, 2003

(30) Foreign Application Priority Data
Sep. 28, 2001   (JP) .............................. 2001-302054

(51) Int. Cl.
*H04N 1/46* (2006.01)
*H04N 1/04* (2006.01)
*H04N 1/00* (2006.01)

(52) U.S. Cl. ...................... 358/505; 358/514; 358/515; 358/408; 358/496; 358/498; 358/474

(58) Field of Classification Search ................ 358/496, 358/498, 497, 474, 408, 494, 486, 401, 514, 358/512, 513; 399/374, 364, 367; 355/23, 355/24; 250/234–236, 216; 382/312, 318, 382/319
See application file for complete search history.

(56) References Cited

U.S. PATENT DOCUMENTS

| | | | |
|---|---|---|---|
| 6,640,082 B1 * | 10/2003 | Mitomi ...................... 399/374 |
| 6,812,957 B1 * | 11/2004 | Chen ........................... 348/98 |
| 6,859,636 B1 * | 2/2005 | Mitomi ....................... 399/367 |
| 6,934,501 B1 * | 8/2005 | Kawai et al. ................ 399/367 |
| 2003/0081265 A1 * | 5/2003 | Watanabe .................... 358/474 |
| 2003/0227654 A1 * | 12/2003 | Shiraishi ...................... 358/474 |
| 2004/0008386 A1 * | 1/2004 | Shiraishi ...................... 358/474 |
| 2005/0157319 A1 * | 7/2005 | Mizuhashi et al. ........... 358/1.9 |
| 2005/0162712 A1 * | 7/2005 | Shiraishi et al. ............. 358/474 |
| 2005/0206968 A1 * | 9/2005 | Sodeura et al. .............. 358/474 |
| 2005/0213167 A1 * | 9/2005 | Shiraishi ...................... 358/474 |

FOREIGN PATENT DOCUMENTS

| JP | A 8-265576 | 10/1996 |
|---|---|---|
| JP | A 11-331493 | 11/1999 |

* cited by examiner

*Primary Examiner*—Cheukfan Lee
(74) *Attorney, Agent, or Firm*—Oliff & Berridge, PLC

(57) ABSTRACT

An image scanning device is provided with first and second sensors for scanning first and second surfaces of a sheet. The first sensor reads a monochromatic image, and the second sensor reads a color image. The image scanning device is further provided with a plurality of image processing systems. A switching system is provided which connects the input terminal of a predetermined one of the image processing systems with the output terminal of the first sensor when the double-side scanning operation is performed. A signal output from one of output terminals of the second sensor other than the terminal connected to the predetermined image processing system is used as an image signal representing the image of the second surface of the sheet when the double-side scanning operation is performed.

20 Claims, 5 Drawing Sheets

IMAGE SCANNER

BACKGROUND OF THE INVENTION

The present invention relates to an image scanner capable of scanning images formed on both sides of a sheet at the same time.

Recently, an image scanner capable of simultaneously scanning images formed on both sides of a sheet has become widespread. In such an image scanner, a CCD (Charge Coupled Device) type image sensor is provided along a sheet path inside the scanner to scan an image formed on one side of sheet, and a CIS (Contact Image Sensor) type image sensor is provided along the sheet path to scan an image formed on the opposite side of the sheet. The image scanner typically includes an ADF (Automatic Document Feeder), and therefore, in order to provide a sufficient room for the ADF and various other peripheral devices, the CIS type image sensor is used as one of the image sensors.

The CIS type image sensor (hereinafter occasionally referred to as a first sensor) scans, for example, a back surface of a sheet to capture an image formed thereon, and the CCD type image sensor (hereinafter occasionally referred to as a second sensor) scans, for example, a front surface of the sheet to capture an image formed thereon.

Each of the output ports of the first and second image sensors is connected with an image processing unit, which typically includes a gain adjusting circuit, A/D converter, compensation circuit and the like for receiving an image (component) signal output therefrom. The image signals (or image component signals) output from the output ports of the sensors are different in terms of a gain adjustment range and compensation parameters used in the compensation circuit. Therefore, the image processing units are provided for respective image signals (image component signals).

With the above-described configuration, when an image formed on one surface of a sheet is scanned to capture a color image, an image sensor provided with RGB (Red, Green and Blue) color filters is used, and the image processing units respectively connected to the output ports, which respectively output RGB color components, of the image sensor are used. When an image formed on one surface of a sheet is scanned to capture a monochromatic image, for example, the image sensor is used for scanning, however, only the image processing unit connected to the output port of, for example, the G (green) component of the color image sensor is used. If both surfaces of a sheet are simultaneously scanned, the image processing units connected to the output ports of both the first and second image sensors are necessary.

It is understood that the image sensor for scanning the back surface of a sheet is used only when both the surfaces of the sheet are scanned, and the image processing unit for this sensor is used only when both the surfaces of the sheet are scanned. Therefore, the conventional image scanner capable of scanning both surfaces of a sheet includes excessive parts, which increases a manufacturing cost.

SUMMARY OF THE INVENTION

The present invention is advantageous in that it provides a simplified configuration of an image scanner, which is still capable of scanning both sides of a sheet simultaneously. Further, the invention provides a method of controlling an image scanner of the above-described type to achieve the advantage.

According to an aspect of the invention, there is provided an image scanning device capable of performing one-side scanning and double-side scanning operations, which is provided with a first sensor that scans an image formed on a first surface of a sheet, the first sensor reading the image and outputting an image signal representing at least one color component of the image, and a second sensor that scans an image formed on a second surface of the sheet, the second sensor reading the image and outputting image signals representing a plurality of color components of the image. The image scanning device is further provided with a plurality of image processing systems that process the signals representing the plurality of color components of the image, respectively. Further, a switching system is provided, which is controlled to selectively connects an input terminal of a predetermined one of the plurality of image processing systems with an output terminal of the first sensor and a predetermined output terminal of the second sensor, the predetermined output terminal of the second sensor outputting a predetermined one of the plurality of color components. The switching system is controlled by a controller that controls the switching system to connect the input terminal of the predetermined one of the plurality of image processing systems with the output terminal of the first sensor when the double-side scanning operation is performed, a signal output from one of output terminals of the second sensor other than the predetermined output terminal being used as an image signal representing the image of the second surface of the sheet when the double-side scanning operation is performed.

With the above-described configuration, an image processing system dedicated to the first sensor becomes unnecessary, which reduces the manufacturing cost. Even though the configuration is simplified, the images on both the sides of a sheet can be scanned substantially simultaneously.

According to an embodiment, each of the plurality of image processing systems includes an amplifier that receives an image signal and amplifies the received image signal, an A/D converter that converts the amplified image signal output by the amplifier to a digital image signal, and an image processing circuit that applies a predetermined image processing to the digital image signal output by the A/D converter.

In a particular case, the first sensor may read the image formed on the first surface of the sheet as a monochromatic image.

Optionally, the controller may control the switching system to connect the input terminal of the predetermined one of the plurality of image processing systems with the predetermined output terminal of the second sensor when the one-side scanning operation is performed.

Further, all of the plurality of color components necessary to reproduce the scanned image may be used as signals representing the scanned image.

In a preferred embodiment, operational parameters for the predetermined one of the plurality of image processing systems are changed depending on whether the input terminal of the predetermined one of the plurality of image processing systems is connected with the predetermined output terminal of the second sensor or the output terminal of the first sensor.

With this configuration, regardless of the sensor connected to the predetermined one of the plurality of image processing systems, appropriate signal can be output therefrom.

Optionally, each of the plurality of image processing systems may include an image compensation circuit, and in this case, the operational parameters include compensation data used by the compensation circuit.

According to another aspect of the invention, there is provided an image scanning device capable of performing one-side scanning and double-side scanning operations, which is provided with a first sensor that scans an image formed on a first surface of a sheet. The first sensor reads the image and outputs an image signal representing at least one color component of the image. The device is further provided with a second sensor that scans an image formed on a second surface of the sheet. The second sensor reads the image and outputs image signals representing a plurality of color components of the image, respectively. The device further includes a plurality of image processing systems that process the signals representing the plurality of color components of the image, respectively. A predetermined one of the plurality of image processing systems is commonly used for processing the image signal output by the first sensor and a predetermined one of the image signals representing the plurality of color components. With this configuration, when the first sensor is used for scanning, the predetermined one of the plurality of image processing systems is used for processing the image signal output by the first sensor. In this case, at least one of the image signals output by the second sensor and corresponding to the predetermined one of the plurality of image processing systems is not used as the image signal representing a component of the image formed on the second surface of the sheet when the first sensor is used for scanning.

According to the embodiment, each of the plurality of image processing systems includes an amplified that receives an image signal and amplifies the received image signal, an A/D converter that converts the amplified image signal output by the amplifier to a digital image signal, and an image processing circuit that applies a predetermined image processing to the digital image signal output by the A/D converter.

With the above-described configuration, an image processing system dedicated to the first sensor becomes unnecessary since a commonly used image processing system is provided, and therefore, the manufacturing cost ca be decreased. Even though the configuration is simplified, the images on the both sides of a sheet can be scanned substantially simultaneously.

Optionally, operation characteristics of the predetermined one of the plurality of image processing systems may be changed depending on whether the image signal output by the first sensor is processed or the predetermined one of the image signals output by the second sensor is processed.

In one case, the predetermined one of the plurality of image processing systems may include at least an amplifier that amplifies a received image signal, the operation characteristics being changed by changing a gain of the amplifier. Optionally or alternatively, the predetermined one of the plurality of image processing systems may include at least a compensation circuit, the operation characteristics being changed by changing operation parameters of the compensation circuit.

In an embodiment, the compensation circuit compensates for a black level of an image represented by an input signal. Optionally or alternatively, the compensation circuit may perform a shading compensation. Further optionally or alternatively, the compensation circuit may perform a gamma compensation.

According to a further aspect of the invention, there is provided a method of controlling an image scanning device capable of performing one-side scanning and double-side scanning operations, the image scanning device including a first sensor that scans an image formed on a first surface of a sheet, the first sensor reading the image and outputting an image signal representing at least one color component of the image, a second sensor that scans an image formed on a second surface of the sheet, the second sensor reading the image and outputting image signals representing a plurality of color components of the image, a plurality of image processing systems that process the signals representing the plurality of color components of the image, respectively, an input terminal of a predetermined one of the plurality of image processing systems being connectable with either of an output terminal of the first sensor and a predetermined output terminal of the second sensor, the predetermined output terminal of the second sensor outputting a predetermined one of the plurality of color components. The method includes steps of disconnecting the input terminal of the predetermined one of the plurality of image processing systems from the predetermined output terminal of the second sensor, and connecting the input terminal of the predetermined one of the plurality of image processing systems with the output terminal of the first sensor when the double-side scanning operation is performed, a signal output from one of output terminals of the second sensor other than the predetermined output terminal being used as an image signal representing the image of the second surface of the sheet when the double-side scanning operation is performed.

In a particular case, the first sensor may read the image formed on the first surface of the sheet as a monochromatic image.

Optionally, the input terminal of the predetermined one of the plurality of image processing systems may be disconnected from the output terminal of the first sensor and may be connected with the predetermined output terminal of the second sensor when the one-side scanning operation is performed.

In an exemplary case, all of the plurality of color components are used as signals representing the scanned image.

Further optionally, operational parameters for the predetermined one of the plurality of image processing systems are changed depending on whether the input terminal of the predetermined one of the plurality of image processing systems is connected with the predetermined output terminal of the second sensor or the output terminal of the first sensor.

The method described above can be incorporated in an image scanning device as programs executed by a CPU thereof, or in a computer connected to the image scanner to control the same.

BRIEF DESCRIPTION OF THE ACCOMPANYING DRAWINGS

FIG. 1 is a perspective view of a facsimile device employing an image scanner according to an embodiment of the invention;

FIG. 2 schematically shows a side view of the facsimile device shown in FIG. 1;

DESCRIPTION OF THE EMBODIMENT

Hereinafter, a facsimile device employing an image scanner according to an embodiment of the invention will be described with reference to the accompanying drawings.

Figure 1:
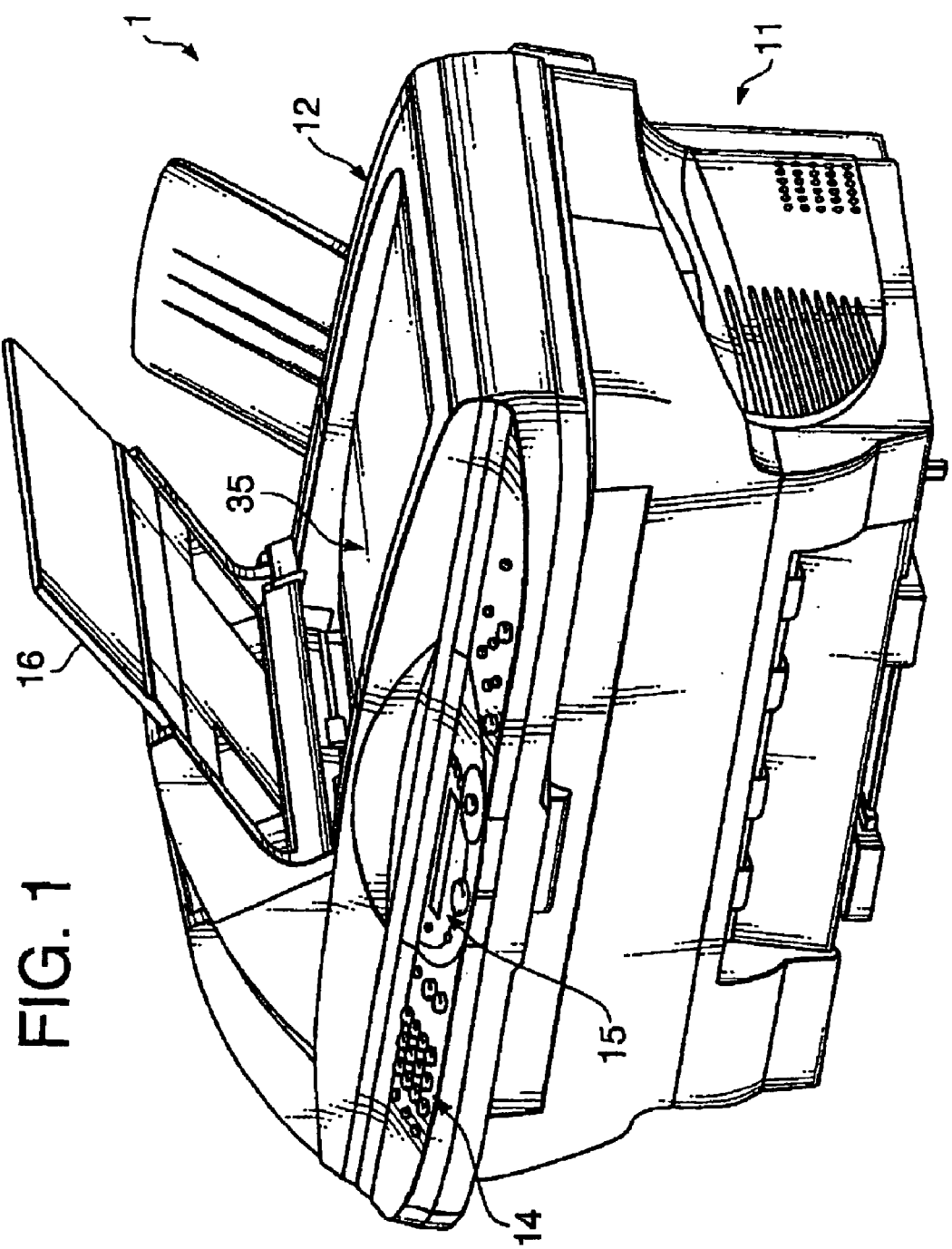
Figure 2:
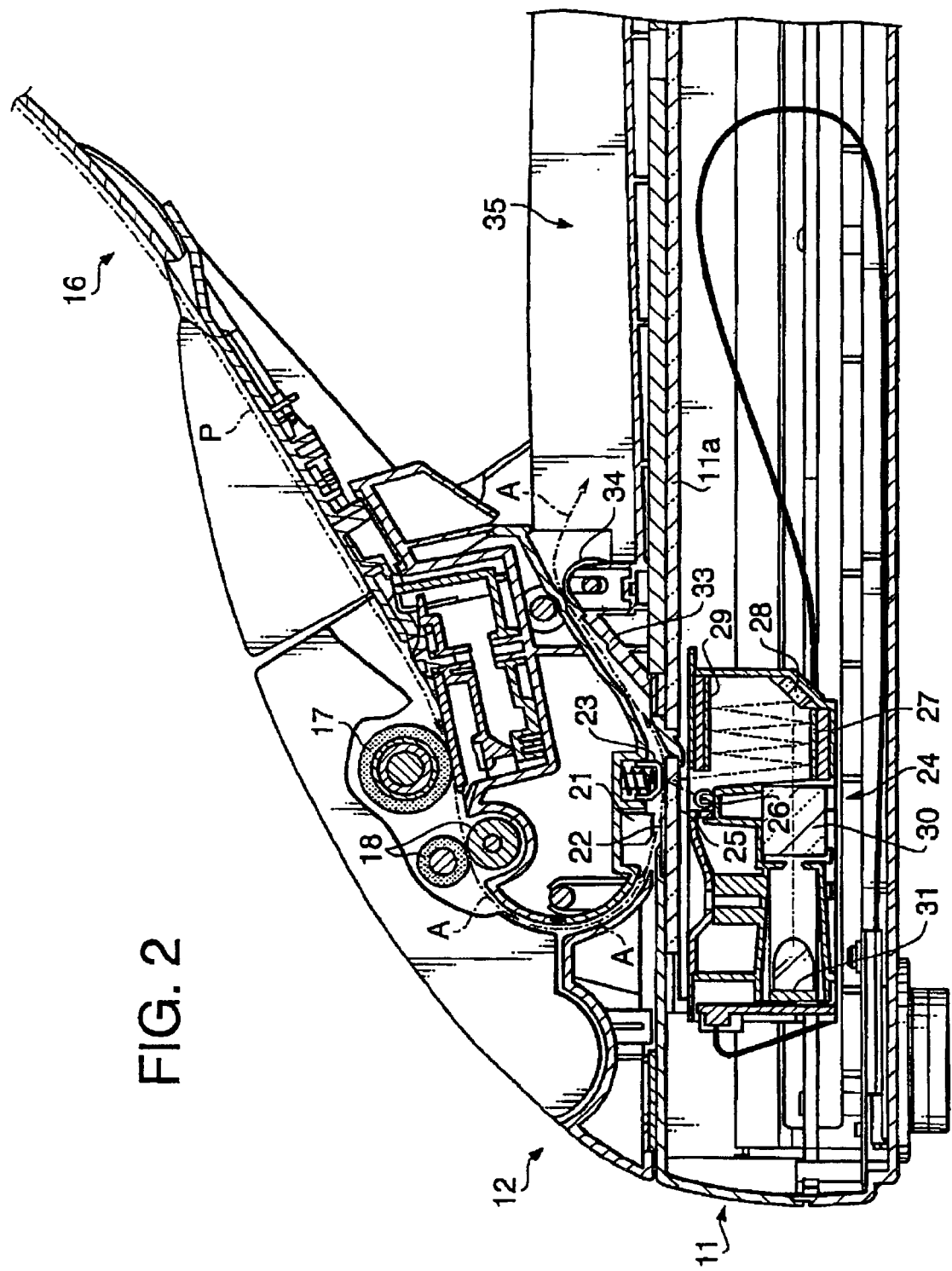

FIG. 1 a perspective view of a facsimile device 1 employing an image scanner according to an embodiment of the invention, and FIG. 2 schematically shows a side view of the facsimile device 1 shown in FIG. 1. The facsimile device 1 is configured to have a function of a printing device according to an inkjet printing method, a communication device and an image scanning device. It should be noted that the facsimile device 1 is capable of functioning as an independent printing device or an image scanner. Further, using the printing device in association with the image scanning device, the facsimile device can be used as a copying machine.

The facsimile device 1 has a main body 11 and a cover 12 which is provided on the main body to openably cover the upper surface of the main body 11. As shown in FIG. 1, on the upper surface of the main body 11, a glass surface 11a (see also FIG. 2) is provided. The facsimile device 1 is therefore a so-called flat-bed type machine, in which a sheet is placed on the glass plate 11a when scanned.

The main body 11 is provided with an operation unit 14 having a plurality of buttons to be manually operated by a user, and a display unit 15 used for displaying various information.

The cover 12 is provided with an automatic sheet feeding mechanism. A plurality of pieces of sheets P are to be stacked on a sheet tray 16, which are fed one by one by the sheet feeding mechanism. As shown in FIG. 2, when the stack of the sheets P are placed on the sheet tray 16, the downstream ends thereof contact a sheet registration roller 17 and are ready for being fed by the sheet registration roller 17 to be introduced in a sheet feed path A. The sheet registration roller 17 is driven to rotate by a not-shown motor.

At an end portion, closely adjacent to the sheet registration roller 17, of the sheet feed path A, a pair of sheet feed rollers 18 are provided, which are driven to rotate by a not-shown motor. A sheet introduced in the sheet feed path A by the sheet registration roller 17 is nipped between the pair of sheet feed rollers 18, and fed thereby toward a downstream side of the sheet feed path A.

Along the sheet feed path A, at portion facing the upper surface of the main body 11, a CIS (Contact Image Sensor) type image sensor 21 (hereinafter occasionally referred to as a first sensor) is provided. The first sensor 21 is capable of reading a monochromatic image. A first white plate 22 is arranged to face the first sensor 21. The first white plate 22 is used to compensating for the unevenness of the light distribution of a light source when an image is scanned by the first sensor 21.

The first sensor 21 is urged toward the first white plate 22 with a not-shown biasing member such as a spring. It should be noted that the first sensor 21 may be urged such that a sheet is nipped between the first sensor 21 and the first white plate 22. With this configuration, because of the close contact between the first sensor 21 and the sheet, an excellent result in image scanning is ensured. Alternatively, the first sensor 21 may be urged such that a predetermined clearance is remained between the first sensor 21 and the first white plate 22. In this case, the sheet can pass through the first sensor 22 smoothly.

Further, along the sheet feed path A, on the downstream side of the first sensor 21 and below the cover 12, a second white plate 23 is arranged. In the main body 11, at a portion facing the second white plate 23, a CCD type image sensor 24 (hereinafter occasionally referred to as a second sensor) is arranged. The second sensor 24 includes a color CCD, and capable of capturing an color image. The second white plate 23 is used to compensate for the unevenness of the light distribution of a light source for the second sensor 24, and shading characteristics of the second sensor 24.

As shown in FIG. 2, the second white plate 23 is urged toward a glass portion 25 with a biasing member (a spring is shown in FIG. 2 as an example). It should be noted that the second white plate 23 may be urged such that a sheet is nipped between the second white plate 23 and the glass portion 25. With this configuration, because of the close contact between the glass portion 25 and the sheet, an excellent image scanning result is expected. Alternatively, the second white plate 23 may be urged such that a predetermined clearance is remained between the second white plate 23 and the glass portion 25. In this case, the sheet can pass through the glass portion 25 smoothly.

Specifically, the second sensor 24 is provided with a white light source 26 including a cold cathode fluorescent lamp, which is arranged to face the second white plate 23 through the glass portion 25, a plurality of mirrors 27, 28 and 29. The light reflected by the sheet P located at the second sensor 24 is further reflected by the mirrors 27, 28 and 29, and a reduction optical system 30 having a lens (not shown) as well as the CCD 31. The light emitted by the light source 26 reaches the color CCD 31 along an optical path indicated by dotted line in FIG. 2.

The first sensor 21 and the second sensor 24 are arranged slightly shifted with respect to each other along the sheet feed path A (i.e., in the sheet feed direction). Since both sensors 21 and 24 reads images by illuminating the sheet with white light, by shifting the position of the light sources, an effect of a light source of one sensor to a light sensor of the other is avoided.

On the downstream side of the second white plate 23 along the sheet feed path A, an inclined portion 33 is formed to guide a sheet as fed to an obliquely upward direction. On the downstream side of the inclined portion 33, a pair of discharging rollers 34 for discharging the sheet are provided. The discharging rollers 34 are driven to rotate by a not-shown motor.

With the above-described configuration, by placing a sheet P on the sheet tray 16 with its front surface upside, the sheet is fed along the sheet feed path A. The front surface of the sheet is scanned by the second sensor 24, and the back side of the sheet is scanned by the first sensor 21.

The sheet, images of which are scanned, is fed in the obliquely upward direction along the inclined portion 33, and is caught by the discharging rollers 34. As the discharging rollers 34 are rotated, the sheet is fed from the downstream end of the sheet feed path A to a concave portion 35 formed on the upper surface of the cover 12 (see FIGS. 1 and 2).

It should be noted that the second sensor 24 is configured to move in a direction perpendicular to the extending direction of the sensor 24. In FIG. 2, the second sensor 24 is movable in the right-and-left direction. Thus, by moving the second sensor 24 with an original sheet placed on the glass surface 11a, the image on the original sheet can be read.

Figure 3:
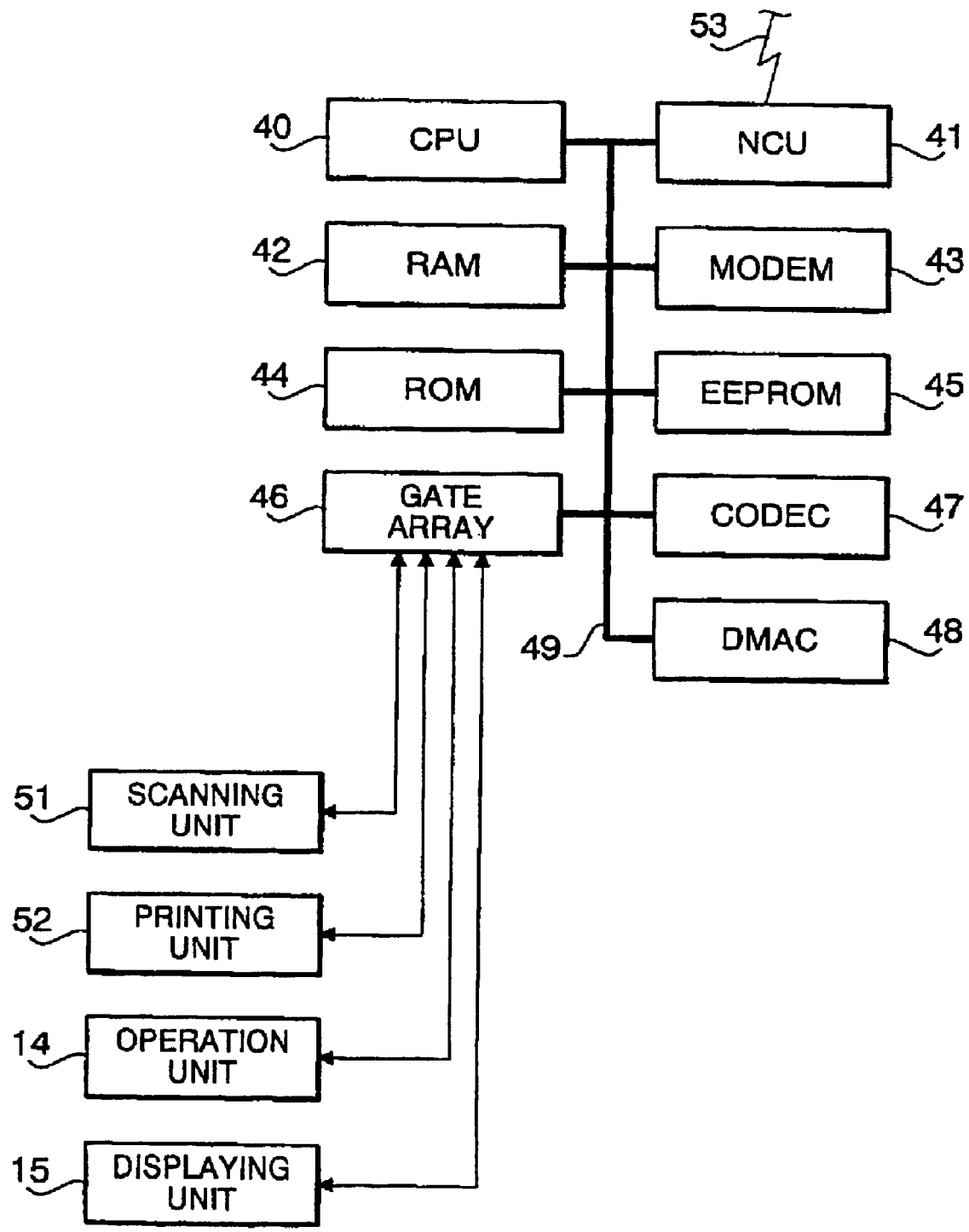
FIG. 3 is a block diagram showing an electrical configuration of the facsimile device shown in FIG. 1.

FIG. 3 is a block diagram showing en electrical configuration of the facsimile device 1.

The facsimile device 1 includes CPU 40, NCU 41, RAM 42, MODEM 43, ROM 44. EEPROM 45, gate array 46, codec 47, and DMAC 48, which are interconnected through a bus 49. The bus 49 includes an address bus, data bus and control signal lines. In addition, the facsimile device 1 is connected, via the gate array 46, with a reading unit 51, a printing unit 52, an operation unit 14 and a displaying unit 15. The NCU 41 is connected to a public telephone line 53.

The CPU 40 controls the entire operation of the facsimile device 1. The NCU 41 performs a network control operation as it is connected with the public telephone line 53. The RAM 42 provides a working area for the CPU 40 and temporarily stores various data. The MODEM 43 functions to modulate/demodulate facsimile data. The ROM 44 stores programs to be executed by the CPU 40. The EEPROM 45 stores various flags, operation parameters referred to by the programs executed by the CPU 40 and the like. The gate array 46 interfaces between the CPU 40 and the reading unit 51, printing unit 52, operation unit 14 and displaying unit 15. The gate array 46 employed in the facsimile device 1 is configured as a gate array chip, which is capable of processing the image signal output by the reading unit 51. The codec 47 performs coding/encoding of facsimile data and the like. The DMAC 48 mainly functions to read/write data in the RAM 42.

The reading unit 51 is provided with the first sensor 21 and the color sensor 24, and read images formed on a sheet under control of the CPU 40. The printing unit 52 includes, for example, an inkjet or thermal transfer printer, which prints letters, characters and graphic figures as color and/or black-and-white images.

The operation unit 14 is provided with alphanumeric keys and various operation keys, and transmits signals representing keys operated by a user to the CPU 40. In particular, the operation unit 14 is provided with a color mode setting key which is operated to select a color image mode when a color image is to be scanned, a scanning mode setting key which is operated to select a one-side scanning mode or a double-side scanning mode in which the both sides of a sheet are simultaneously scanned. It should be noted that, in the facsimile device 1 according to the embodiment, when it operate in the double-side scanning mode (i.e., the images formed on the both sides of a sheet are scanned simultaneously), both images are scanned as monochromatic images.

The displaying unit 15 is provided with, for example, an LCD (liquid crystal display), and an operation status of the facsimile device 1, operation guidance and the like are displayed on the LCD.

Figure 4:
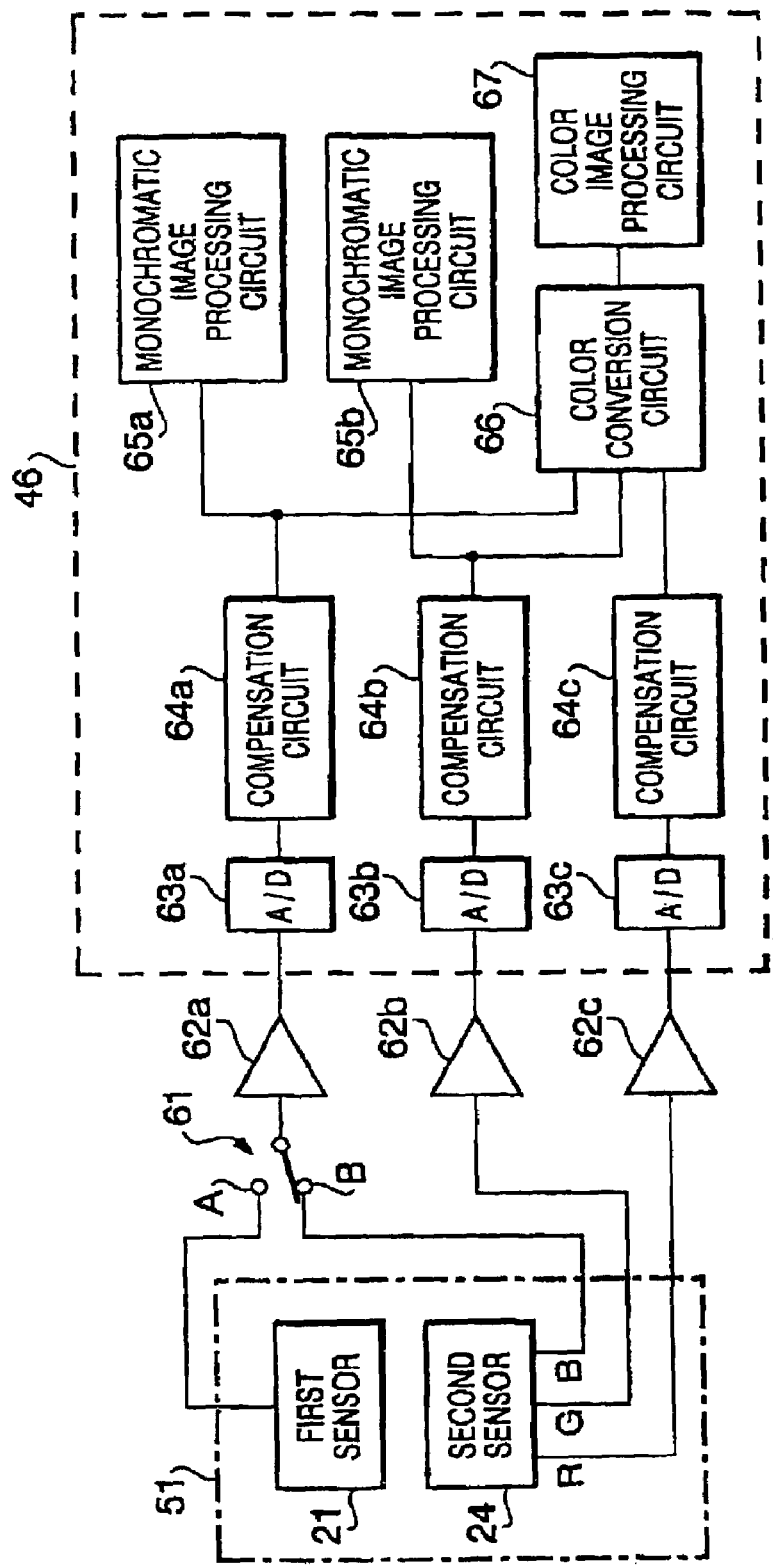
FIG. 4 is a block diagram showing an electrical configuration of a gate array.

FIG. 4 is a block diagram showing a circuitry of the gate array 46, which circuitry processes image signals output by the first and second sensors 21 and 24. The circuitry includes a switch 61, first through third gain adjusting circuits 62a, 62b and 62c, first through third A/D converters 63a, 63b and 63c, first through third compensation circuits 64a, 64b and 64c, two monochromatic image processing circuits 65a and 65b, a color conversion circuit 66, a color image processing circuit 67. It should be noted that, in the above configuration, the first through third A/D converters 63a, 63b and 63c, the first through third compensation circuits 64a, 64b and 64c, the two monochromatic image processing circuits 65a and 65b, the color conversion circuit 66, and the color image processing circuit 67 are included in the gate array circuit 46, while the switch 61 and the first through third gain adjusting circuits 62a, 62b and 62c are not included in the gate array 46, and arranged as peripheral circuits of the gate array 46.

The connection status of the switch 61 is controlled by the CPU 40 depending on whether the first sensor is to be used for reading an image. In other words, the switch 61 is used for selecting whether the both sides of a sheet are to be scanned simultaneously.

As shown in FIG. 4, the switch 61 selectively connects an input port of the gain adjusting circuit 62 with the output terminal A of the first sensor 21 or a B (blue) component output terminal B of the second sensor 24. That is, if the switch 61 is connected to the terminal A, only one side of a sheet is scanned, and a color image or a monochromatic image can be read. If the switch 61 is connected to the terminal B, both sides of a sheet are simultaneously scanned and monochromatic images for both sides of the sheet are obtained.

The gain adjusting circuits 62a, 62b and 62c amplify the image signals output by the first sensor 21 or the second sensor 24 so as to have predetermined level of voltage values, respectively. As shown in FIG. 4, the input terminal of the first gain adjusting circuit 62a is connected to the switch 61, the input terminal of the second gain adjustment circuit 62b is connected to a G (green) component output terminal of the second sensor 24, and an input terminal of the third gain adjusting circuit 62c is connected to an R (red) component output terminal of the second sensor 24. As described above, the first gain adjusting circuit 62a is selectively connected with the output terminal A of the first sensor 21 or the R component output terminal of the second sensor 24. Since the level of the signals of the output of the first sensor 21 and the R component output of the second sensor 24 are different, the first gain adjusting circuit 62a is configured such that an adjusting range (i.e., the gain) thereof is changeable in accordance with a control signal transmitted from the CPU 40.

The first through third A/D converters 63a, 63b and 63c are connected with output terminals of the first through third gain adjusting circuits 62a, 62b and 62c, and convert signals output thereby, respectively, and convert analog image signals into digital image signals.

The first through third compensation circuits 64a, 64b and 64d perform compensation process which includes, for example, black level adjustment, shading correction, gamma correction and the like, with respect to the digital image signals output from the first through third A/D converters 63a, 63b and 63c.

It should be noted that, since the output of the first sensor 21 or the B component of the second sensor 24 is selectively input to the first compensation circuit 64a through the first gain adjusting circuit 62a and the first A/D converter 63a, the compensation parameters used in the first compensation circuit 64a are switched, in accordance with control signals from the CPU 40, so as to meet the input signal.

The first and second monochromatic image processing circuits 65a and 65b respectively apply predetermined monochromatic Image processing operations to monochromatic image signals. The first monochromatic image processing circuit 65a is connected with the output terminal of the first compensation circuit 64a, while the second monochromatic image processing circuit 65b is connected with the output terminal of the second compensation circuit 64b.

The color conversion circuit 66 receives the signals representative of R, G and B components from the compensation circuits 64a, 64b and 64c, and outputs, for example, a standard RGB image signal.

The color image processing circuit 67 further processes the output signal of the color conversion circuit 66.

With the above-described configuration, the image signal output by the first sensor 21 is input to the first gain adjusting circuit 62a when the switch 61 is connected to terminal A.

The signal input to the gain adjusting circuit 62*a* is transmitted through the first A/D converter 63*a* to the first compensation circuit 64*a*. It should be emphasized that the gain adjusting circuit 62*a*, the first A/D converter 63*a* and the first compensation circuit 64*a* are originally designed for processing the B component of the second sensor 24, and are commonly used by both sensors 41 and 42. Therefore, it becomes unnecessary to provide additional gain adjusting circuit, A/D converter and compensation circuit dedicated for the first sensor 21. Accordingly, the structure of the circuitry is simplified, which decreases the manufacturing cost.

Figure 5:
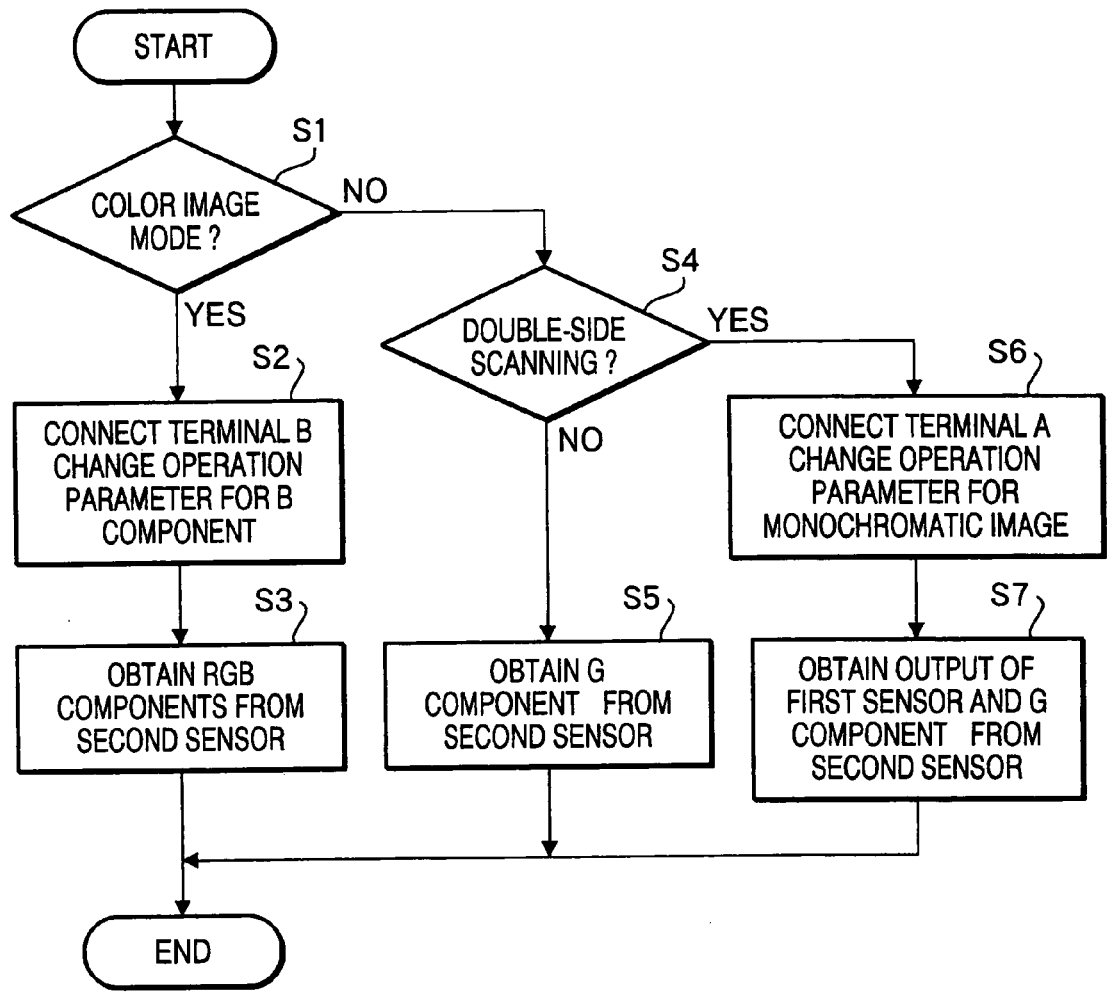
FIG. 5 is a flowchart illustrating an image scanning procedure.

FIG. 5 is a flowchart illustrating an image scanning procedure performed by the CPU 40.

In S1, it is judged whether a user intends to operate the facsimile device 1 in a color mode based on an operation status of color mode setting key on the operation unit 14. If the color mode setting key is operated, a signal representative of the operation of the color mode setting key is transmitted to the CPU 40. The CPU 40 then judges that the color image mode is selected, and controls the switch 61 to be connected with the terminal B, and set the operation parameters of the first gain adjusting circuit 62*a* and the first compensation circuit to values corresponding to the B component of the second sensor 24 (S2).

Then, upon operation of a start key provided on the operation unit 14, the CPU 40 controls circuitry shown in FIG. 4 to process the RGB components signals output by the second sensor 24 (S3). Specifically, the R component signal is input to the third gain adjusting circuit 62*c*, where the amplitude of the signal is adjusted. The R component signal is then input to the third A/D converter 63*c*, where the input signal (analog) is converted into a digital R component image signal. The R component signal is then input to the third compensation circuit 64*c*, where the black level compensation, shading compensation, gamma compensation and the like are performed.

Similarly, the G component signal is input to the second gain adjusting circuit 62*b*, where the amplitude of the signal is adjusted. The G component signal is then input to the second A/D converter 63*b*, where the input signal (analog) is converted into a digital G component image signal. The G component signal is then input to the second compensation circuit 64*b*, where the black level compensation, shading compensation, gamma compensation and the like are performed.

The B component signal is input, via the switch 61, to the first gain adjusting circuit 62*a*, where the amplitude of the signal is adjusted. The B component signal is then input to the first A/D converter 63*a*, where the input signal (analog) is converted into a digital G component image signal. The B component signal is then input to the first compensation circuit 64*a*, where the black level compensation, shading compensation, gamma compensation and the like are performed.

The output signals of the first through third compensation circuits 64*a*, 64*b* and 64*c* are input to the color conversion circuit 66, where a predetermined color conversion process is performed. The output signals of the color conversion circuit 66 is input to the color image processing circuit 67, where color image processing operations including superimposition of the RGB components and the like are performed. Then, the color image processing circuit 67 outputs the color image signal in the form of color image data.

The color image data output by the color image processing circuit 67 is, for example, transmitted to the printing unit 52, which prints the color image on a predetermined sheet.

Optionally or alternatively, the color image data output by the color image processing circuit 67 may be transmitted as facsimile data through the modem 43, the NCU 41 and the public telephone line 53. Further optionally or alternatively, if a personal computer or the like is connected to the facsimile device 1 through a not shown interface such as a USB, the color image data can be transmitted to the personal computer through the interface.

If the user has not depressed the color mode button (S1: NO), then a status of a scanning mode setting key provided on the operation unit 14 (S4) is detected.

If the scanning mode setting key is operated to select a one-side scanning mode (S4: NO), control proceeds to S5. In this case, upon operation of the start key by the user, the image on the second sensor 24 side of the sheet is scanned as a monochromatic image using the second sensor 24. In this case, the CPU 40 controls the circuitry shown in FIG. 4 such that only the G component signal output by the second sensor 24 is processed as the monochromatic image signal (S5).

In this case, the G component signal output from the second compensation circuit 64*b* is input to the monochromatic image processing circuit 65*b*. As shown in FIG. 4, the output terminal of the second compensation circuit 64*b* is connected to both the input terminals of the color conversion circuit 66 and the monochromatic image processing circuit 65*b*. When the color image mode is not selected (S1: NO), the color conversion circuit 66 and the color image processing circuit 67 are not actuated, and therefore, when the one-side mode and monochromatic scanning mode are selected, the monochromatic image processing circuit 65*b* outputs image data representative of scanned image.

It should be noted that the values of operation parameters for the first gain adjusting circuit 62*a* and the first compensation circuit 64*a* are not changed since the B component image signal output by the second sensor 24 is not used when the image scanning operation is performed in the one-side and monochromatic mode.

Alternatively or optionally, B component and/or R component image signals may be used to capture monochromatic images. If the R component is used, another monochromatic image processing circuit is connected to the output terminal of the third compensation circuit 64*c*.

If, in S4, it is judged that the scanning mode setting key is operated to select the double-side scanning mode (S4: YES), the CPU 40 controls the switch 61 to connect the terminal A, and changes values of operation parameters for the first gain adjusting circuit 63*a* and the first compensation circuit 64*a* to those suitable for processing the signal output by the first sensor 21 (S6).

Upon operation of the start key, the image signals output by the first sensor 21 and the G component signal output by the second sensor 24 are processed (S7).

In this case, the output signal of the first sensor 21 is input, via the switch 61, to the first gain adjusting circuit 62*a*. The output of the first gain adjusting circuit 62*a* is transmitted through the A/D converter 63*a* to the first compensation circuit 64*a*. The output of the first compensation circuit 64*a* is input to the monochromatic image processing circuit 65*a*, where a predetermined monochromatic image processing is applied. Similarly to a case where the one-side monochromatic mode is performed, the G component signal output from the second compensation circuit 64*b* is input to the monochromatic image processing circuit 65*b*.

As described above, the monochromatic image data representing a monochromatic image formed on one side of the sheet is output by the monochromatic image processing circuit 65*a*, and the monochromatic image data representing a monochromatic image formed on the opposite side of the sheet is output by the monochromatic image processing circuit 65*b*.

It should be stressed that the above-described embodiment is an exemplary embodiment, and the present invention is not limited to the configuration described above, but various modifications can be derived without departing from the gist of the invention.

For example, in the above-described embodiment, an image sensor for monochromatic image is used as the first sensor. However, a color image sensor can be used as the first sensor. Further, the first sensor 21 and the second sensor 24 are not limited to the CIS type sensor and the CCD type sensor, respectively.

In the embodiment, the scanning device incorporated in the facsimile device is described. The invention is not limited to this configuration, and the invention is applicable to a stand-alone scanning device, a printer incorporating the scanning device, and the like. Further, the scanning device is not limited to a predetermined type (e.g., flat-bed type) scanner. The invention can be applied to scanners having any configuration if the two sensors can be provided so as to scan both sides of a sheet substantially at the same time.

In the above-described embodiment, every time when the operation mode is switched between the color image mode and the double-side monochromatic image mode, the terminal to which the switch 61 is connected is changed, and the values of the operation parameters for the first gain adjusting circuit 62*a* and the first compensation circuit 64*a* are changed to meet the selected mode. This configuration may be modified as indicated below.

If the facsimile device 1 is used in the monochromatic mode (one-side of double-side) more frequently than in the color mode, it may be convenient to normally connect the switch 61 to the terminal A, and the values of the operation parameters of the for the first gain adjusting circuit 62*a* and the first compensation circuit 64*a* are set corresponding to the monochromatic mode. The above setting may be used as a default setting. With such a configuration, when a color image is to be scanned, the values of the operation parameters of the for the first gain adjusting circuit 62*a* and the first compensation circuit 64*a* are temporarily changed to values suitable to the color image mode, and after the scanning operation is finished, the operation parameters and status of the switch 61 are reset to the default value. Of course, if the color image is frequently scanned, the setting (i.e., the operation parameters for the first gain adjusting circuit 62*a* and the first compensation circuit 64*a* and the status of the switch 61) for the color image may be used as the default setting.

The present disclosure relates to the subject matter contained in Japanese Patent Application No. 2001-302054, filed on Sep. 28, 2001, which is expressly incorporated herein by reference in its entirety.

What is claimed is:

1. An image scanning device capable of performing one-side scanning and double-side scanning operations, comprising:

a first sensor that scans an image formed on a first surface of a sheet, said first sensor reading the image and outputting an image signal representing at least one color component of the image;

a second sensor that scans an image formed on a second surface of the sheet, said second sensor reading the image and outputting image signals representing a plurality of color components of the image;

a plurality of image processing systems that process the signals representing the plurality of color components of the image, respectively;

a switching system that is controlled to selectively connects an input terminal of a predetermined one of said plurality of image processing systems with an output terminal of said first sensor and a predetermined output terminal of said second sensor, said predetermined output terminal of said second sensor outputting a predetermined one of said plurality of color components; and a controller that controls said switching system to connect the input terminal of said predetermined one of said plurality of image processing systems with the output terminal of said first sensor when the double-side scanning operation is performed, a signal output from one of output terminals of said second sensor other than said predetermined output terminal being used as an image signal representing the image of the second surface of the sheet when the double-side scanning operation is performed.

2. The image scanning device according to claim 1, wherein each of said plurality of image processing systems includes:

an amplifier that receives an image signal and amplifies the received image signal;

an A/D converter that converts the amplified image signal output by said amplifier to a digital image signal; and an image processing circuit that applies a predetermined image processing to the digital image signal output by said A/D converter.

3. The image scanning device according to claim 1, wherein said first sensor reads the image formed on the first surface of the sheet as a monochromatic image.

4. The image scanning device according to claim 1, wherein said controller controls said switching system to connect the input terminal of said predetermined one of said plurality of image processing systems with the predetermined output terminal of said second sensor when the one-side scanning operation is performed.

5. The image scanning device according to claim 4, wherein all of the plurality of color components necessary to reproduce the scanned image are used as signals representing the scanned image.

6. The image scanning device according to claim 4, wherein operational parameters for said predetermined one of the plurality of image processing systems are changed depending on whether the input terminal of said predetermined one of said plurality of image processing systems is connected with the predetermined output terminal of said second sensor or the output terminal of said first sensor.

7. The image scanning device according to claim 6, wherein each of said plurality of image processing systems include an image compensation circuit, said operational parameters including compensation data used by said compensation circuit.

8. An image scanning device capable of performing one-side scanning and double-side scanning operations, comprising:

a first sensor that scans an image formed on a first surface of a sheet, said first sensor reading the image and outputting an image signal representing at least one color component of the image;

a second sensor that scans an image formed on a second surface of the sheet, said second sensor reading the image and outputting image signals representing a plurality of color components of the image;

a plurality of image processing systems that process the signals representing the plurality of color components of the image, respectively, a predetermined one of said plurality of image processing systems being commonly used for processing the image signal output by said first sensor and a predetermined one of the image signals representing the plurality of color components, wherein, when said first sensor is used for scanning, said predetermined one of said plurality of image processing systems is used for processing the image signal output by said first sensor, wherein at least one of the image signals output by said second sensor and corresponding to said predetermined one of said plurality of image processing systems is not used as the image signal representing a component of the image formed on the second surface of the sheet when said first sensor is used for scanning.

9. The image scanning device according to claim 8, wherein each of said plurality of image processing systems includes:
   an amplified that receives an image signal and amplifies the received image signal;
   an A/D converter that converts the amplified image signal output by said amplifyier to a digital image signal; and
   an image processing circuit that applies a predetermined image processing to the digital image signal output by said A/D converter.

10. The image scanning device according to claim 8, wherein operation characteristics of said predetermined one of said plurality of image processing systems is changed depending on whether the image signal output by said first sensor is processed or the predetermined one of the image signals output by the second sensor is processed.

11. The image scanning device according to claim 10, wherein said predetermined one of said plurality of image processing systems includes at least an amplifier that amplifies a received image signal, the operation characteristics being changed by changing a gain of said amplifier.

12. The image scanning device according to claim 10, wherein said predetermined one of said plurality of image processing systems includes at least a compensation circuit, the operation characteristics being changed by changing operation parameters of said compensation circuit.

13. The image scanning device according to claim 12, wherein said compensation circuit compensates for a black level of an image represented by an input signal.

14. The image scanning device according to claim 12, wherein said compensation circuit performs a shading compensation.

15. The image scanning device according to claim 12, wherein said compensation circuit performs a gamma compensation.

16. A method of controlling an image scanning device capable of performing one-side scanning and double-side scanning operations, the image scanning device including a first sensor that scans an image formed on a first surface of a sheet, the first sensor reading the image and outputting an image signal representing at least one color component of the image, a second sensor that scans an image formed on a second surface of the sheet, the second sensor reading the image and outputting image signals representing a plurality of color components of the image, a plurality of image processing systems that process the signals representing the plurality of color components of the image, respectively, an input terminal of a predetermined one of the plurality of image processing systems being connectable with either of an output terminal of the first sensor and a predetermined output terminal of the second sensor, the predetermined output terminal of the second sensor outputting a predetermined one of the plurality of color components, said method comprising:

disconnecting the input terminal of the predetermined one of the plurality of image processing systems from the predetermined output terminal of the second sensor; and connecting the input terminal of the predetermined one of the plurality of image processing systems with the output terminal of the first sensor when the double-side scanning operation is performed, a signal output from one of output terminals of the second sensor other than the predetermined output terminal being used as an image signal representing the image of the second surface of the sheet when the double-side scanning operation is performed.

17. The method according to claim 16, wherein the first sensor reads the image formed on the first surface of the sheet as a monochromatic image.

18. The method according to claim 16, wherein the input terminal of the predetermined one of the plurality of image processing systems is disconnected from the output terminal of the first sensor and is connected with the predetermined output terminal of the second sensor when the one-side scanning operation is performed.

19. The method according to claim 18, wherein all of the plurality of color components are used as signals representing the scanned image.

20. The method according to claim 18, wherein operational parameters for the predetermined one of the plurality of image processing systems are changed depending on whether the input terminal of the predetermined one of the plurality of image processing systems is connected with the predetermined output terminal of the second sensor or the output terminal of the first sensor.

* * * * *